United States Patent [19]

Wang et al.

[11] 4,087,405
[45] May 2, 1978

[54] POLYHYDRAZIDES AS STABILIZERS FOR POLYOLEFINS

[75] Inventors: Richard H. S. Wang; Gether Irick, Jr., both of Kingsport, Tenn.

[73] Assignee: Eastman Kodak Company, Rochester, N.Y.

[21] Appl. No.: 828,133

[22] Filed: Aug. 26, 1977

[51] Int. Cl.$^2$ ............... B07D 109/06; C07D 109/087; C08K 5/36; C08G 69/42
[52] U.S. Cl. ......................... 260/45.9 NC; 260/78 R; 260/45.95 R; 260/558 H; 260/559 H; 260/561 H
[58] Field of Search ........ 260/45.9 NC, 78 R, 558 H, 260/559 H, 561 H, 45.95 R

[56] References Cited

U.S. PATENT DOCUMENTS

| | | | |
|---|---|---|---|
| 2,615,862 | 10/1952 | McFarlane et al. | 260/78 R |
| 3,130,182 | 4/1964 | Frazer | 260/78 R |
| 3,260,746 | 7/1966 | Broadbent et al. | 260/561 H |
| 3,549,572 | 12/1970 | Minagawa et al. | 260/559 H |
| 3,734,885 | 5/1973 | Muller et al. | 260/559 H |
| 4,043,976 | 8/1977 | Yoshikawa et al. | 260/45.9 NC |

*Primary Examiner*—V. P. Hoke
*Attorney, Agent, or Firm*—Elliott Stern; Daniel B. Reece, III

[57] ABSTRACT

Polyhydrazides of 3,3'-thiodipropionylhydrazide and bis(acid chlorides) are useful as hydrogen peroxide decomposers and copper deactivators for the thermooxidative stabilization of polyolefins.

6 Claims, No Drawings

POLYHYDRAZIDES AS STABILIZERS FOR POLYOLEFINS

This invention relates to the stabilization of poly-α-olefin compositions that are ordinarily susceptible to degradation when in physical contact with copper and copper-containing alloys. More specifically, this invention relates to novel compositions of matter which when used in conjunction with primary ortho hindered phenolic antioxidants are effective as secondary antioxidants and copper deactivators.

It is generally known polyolefins are subject to degradation initiated and catalyzed by various factors such as oxygen, heat, ultraviolet light, and metals. Many materials have been found that provide an acceptable level of protection against such degradation. This has been especially true of degradation caused by ordinary heat, oxygen, and ultraviolet light. Degradation of poly-α-olefins caused by physical contact with copper, or copper-containing alloys has been difficult to overcome. Evidently, physical contact with copper causes a reduction in the useful "lives" of such polymers of as much as ninety percent or more. In the case of polypropylene, which ordinarily has excellent electrical properties and exceptional covering capacity (per pound of polymer), the potential use of this polymer as an electrical insulating material (on wire for example), has not been fully exploited to date due to the very high degree of degradation that occurs when it is in contact with the surface of the copper. While certain materials have been suggested as inhibitors for such copper-catalyzed degradation (for example see U.S. Pat. Nos. 3,549,572, 3,484,285 and 3,440,210), because of several factors including cost and various properties of the "inhibitors" (for example, some "bleed" from the polymer and/or discolor or dye the polymer), there has not, heretofore, been available a completely acceptable way to stabilize these susceptible polyolefins against copper-catalyzed degradation.

Prior to this invention the undesired degradation was controlled with a stabilizer system for wire coating formulations consisting of a primary ortho hindered phenolic antioxidant {e.g., bis-(methyl-heptadecyl)-p-cresol (BMHPC) or, for example, Irganox 1010, a product identified as tetrakis[3-(3,5-di-tert-butyl-4-hydroxyphenyl)propionyloxymethyl]methane}, secondary antioxidant or hydroperoxide decomposer (e.g., dilauryl-3,3'-thiodipropionate), and a copper deactivator (e.g., oxalyl-bis-benzylidenehydrazide). The compounds of this invention are a novel class of nonvolatile stabilizers which provide in a single compound the stabilization effectiveness of a secondary antioxidant and a copper deactivator, as well as exhibit resistance to extraction from polyolefins by petrolatum.

Accordingly, there are provided compositions having the formulas

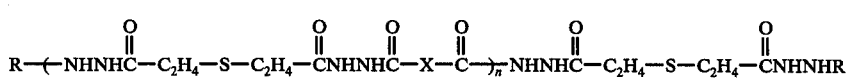

or

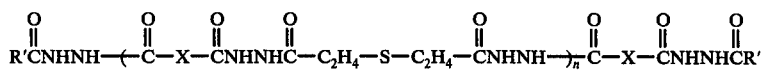

wherein
R is hydrogen or

R' is alkyl having 1 to about 20 carbon atoms, benzyl, phenyl, phenyl substituted with alkyl having 1 to about 12 carbon atoms, hydroxy, or alkoxy having 1 to about 8 carbon atoms;

$n$ is an integer of 1 to about 10; and

X is alkylene having 1 to about 8 carbon atoms, phenylene or phenylene substituted with methyl or hydroxy.

In a preferred embodiment of this invention R' is methyl, lauryl, stearyl, phenyl, or phenyl substituted with methyl, t-butyl, hydroxyl, methoxy or octoxy, or ethyl substituted with phenyl, or 3,5-di-tert-butyl-4-hydroxyphenyl; X is alkylene of 2 to about 4 carbon atoms, phenylene, or phenylene substituted with methyl or hydroxy; and $n$ is an integer of 1 to about 5.

It will be appreciated by those skilled in the art that the value of $n$ is an average number that will vary depending upon the amount of the reactants used to prepare the particular polyhydrazide.

These compounds can be manufactured by reacting a 3,3'-thiodipropionic acid dihydrazide and suitable bis(acid chloride) as further shown in the examples. The concentration of polyhydrazide useful in the practice of the invention is at an effective stabilizing value. This value generally depends upon the extent of stabilization desired, which in turn depends upon many variables (that are readily appreciated by those skilled in the art) such as the particular end use of the stabilized product, the processing conditions to which the stabilized product is to be subjected, and the life expectancy desired for the stabilized product. Generally, however, the concentration of polyhydrazide will be within the range of from 0.1 to about 25 weight percent, preferably within the ratio of from about 0.1 to about 10 weight percent based on the weight of the poly-α-olefin with which the polyhydrazide is intermixed. Additionally, the amount of primary antioxidant utilized will vary as well.

By phenolic antioxidant we mean any organic phenol which exhibits antioxidant properties when compatible with and incorporated in a normally oxidizable organic material, for example, hydrocarbons such as paraffin wax, petroleum oils including gasoline and other motor fuels, polypropylene, polyethylene and other normally solid polymers of α-monoolefins, petroleum derivatives such as lubricating oils, transformer oils and the like, polyesters including linear polyesters and alkyd resins, synthetic rubber compositions, natural rubber compositions, insecticide compositions, medicinal preparations, and similar compositions.

Thus, a wide variety of phenolic antioxidants can be effectively utilized in combination with the compositions of this invention. Illustrative of such phenolic antioxidants are certain alkylidenebisphenols, such as those described in U.S. Pat. No. 3,033,814.

Additional effective primary antioxidants are described in U.S. Pat. No. 3,378,516, column 4, lines 53–75 and column 5, line 1, through column 9, line 28, incorporated herein by reference.

Among the poly-alpha-olefins which are especially susceptible to spontaneous degradation when they are contacted with copper or copper-containing alloys are all of those polymers which result from the polymerization of alpha-olefins that contain 3–20 carbon atoms. Included among the poly-alpha-olefins especially susceptible to such spontaneous degradation are block or graft copolymers having at least a significant portion of their molecules in the form of such polymerized alpha-olefins including copolymers of ethylene and propylene in which the ethylene comprises up to about 98 weight percent of said copolymer. The specially inhibited compositions of the present invention comprise the combination of such ordinarily copper-degradable poly-alpha-olefins and the polythiodipropionyl hydrazide inhibitor. The poly-alpha-olefin portion of such compositions generally comprises at least one, normally solid, poly-alpha-olefin derived from a 1-monoolefinic hydrocarbon containing 3–20 carbon atoms, typically 3–10 carbon atoms, and in addition, can comprise a mixture of such a poly-alpha-olefin with up to about 98 weight percent polyethylene. Examples of normally solid poly-alpha-olefins that are ordinarily subject to the copper-catalyzed degradation described above include the linear or branched, low density, medium density, or high density, crystalline or amorphous, normally solid homopolymers of propylene, 1-butene, isobutylene, 1-pentene, alphamethyl-1-butene, 1-hexene, 3,3-dimethyl-1-butene, 1-heptene, 1-octene, 1-nonene, 1-decene, 4-methyl-1-pentene, 4-methyl-1-hexene, 4-ethyl-1-hexene, 6-methyl-1-heptene, 6-ethyl-1-heptene, styrene, 1-alkenyl benzene, and the like; mixtures thereof with each other or with polyethylene; and copolymers thereof with each other or with ethylene. Polyethylene is less susceptible to degradation when in physical contact with copper than polymers derived from olefins containing 3 or more carbon atoms. However, if polyethylene is employed in such a way that degradation by physical contact with copper becomes objectionable, the polyethylene can be stabilized in accordance with our invention. Processes for preparing such normally solid poly-alpha-olefins are well known and need not be detailed here. For example, U.S. Pat. No. 2,153,553 to Fawcett et al., U.S. Pat. No. 2,912,429 to Cash and U.S. Pat. No. 2,917,500 to Hagemeyer et al illustrate such processes. The term "normally solid poly-alpha-olefins" as used herein means a thermoplastic material (derived as stated above) which is solid at 20° C. The term also includes the so-called poly-alpha-olefin waxes (normally having average molecular weights of from about 3,000 to about 12,000) that are so derived.

It should be noted that the normally solid poly-alpha-olefins that are useful in the successful practice of the present invention can be intermixed with other polymeric materials (usually a different kind of polymers that is present as a physical property improver e.g., brittleness characteristics at low temperatures) without detracting substantially from the benefits that can be derived from practicing the invention. In addition, other additives can be present in the specially stabilized compositions of this invention. For example, antioxidants, thermal stabilizers, ultraviolet light stabilizers, anti-corrosive agents, antistatic agents, foaming agents, plasticizers, colorants such as dyes and pigments, waxes, mold release agents, slip and/or antislip agents, antiblocking agents, fillers, extenders, and the like, including physical property improvers other than the aforementioned polymeric compounds can all be utilized. Also mixtures of the copper inhibitor-stabilizers of the present invention can be used in the successful practice thereof.

The normally solid, poly-α-olefin resin composition of this invention can be made by incorporating the polythiodipropionyl hydrazide material into the normally solid, poly-α-olefin resin material. Generally, such incorporation is performed by any one of a number of known methods, such as, for example, roll compounding, extrusion, solvent mixing and the like. For instance, such incorporation can be performed by heating or otherwise softening the normally solid resin material to a workable consistency and then working in, as by roll compounding, the polythiodipropionyl hydrazide of this invention until a substantially uniform blend or dispersion is obtained. Generally, such incorporation takes place at the same time that other additives are normally incorporated into the poly-α-olefin resin material and usually along with such other additives as the formulation of the particular embodiment of the plastic composition requires.

In addition to being useful as a coating material for copper wire, the normally solid plastic compositions of this invention are useful in other types of coating and as materials of construction for shaped articles. Thus, the compositions can be made into various shaped articles such as, for example, pellets, sheeting, films, bars, tubes, filaments, and specially shaped structural elements such as those made by conventional casting and molding techniques (which include extrusion, blow molding, and the like). The presently stabilized materials can also be impregnated with copper and copper-containing pigments for certain special effects, if desired.

In the following examples, which are illustrative of some of the preferred embodiments of this invention, all parts given are by weight unless otherwise specified.

The results of oven tests for polyhydrazides in polyallomer are shown in Table 1. In the following examples, the term "oven aging longevity" is used to designate the number of hours that a test specimen survived continuous exposure (in the form of bars 8½ inch × ¾ inch × ⅛ inch) in a Hotpack oven having a relatively low level of internal air circulation at a temperature of 140° C. and 160° C. The first signs of oxidative degradation are taken to denote failure of the specimen. Each test is run with ten test bars distributed throughout the oven, and the "oven aging longevity" figure given is an average of the ten results. Results of this test are believed to simulate results in actual practice in a relative manner.

EXAMPLE 1

Preparation of poly(thiodipropionyldicarbonyl)hydrazides with the general structures A and B as follows:

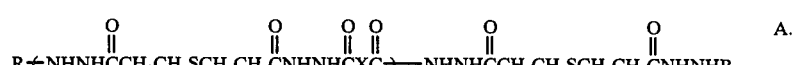

-continued

B.

R'CNHNH(CXCNHNHCCH₂CH₂SCH₂CH₂CNHNH)ₙ—CXCNHNHCR'
(with O's double-bonded above each C)

wherein R may be hydrogen or

R'C— (with =O);

R' may be alkyl, aryl or arylalkyl; X may be alkylene or arylene; and n is an integer of 1 to 10.

| Polyhydrazides | Structure | Name |
|---|---|---|
| ATIH | A | Diacetylpoly(thiodipropionylisophthaloyl)hydrazides (n=1) |
| ATAH | A | Diacetylpoly(thiodipropionyladipyl)hydrazides (n=1) |
| TIH | A | Poly(thiodipropionylisophthaloyl)hydrazides |
| TAH | A | Poly(thiodipropionyladipyl)hydrazides |

(ClCXCCl) (with O's above the C's)

in toluene was added and the mixture was refluxed for 1 hour. Subsequently, a monoacid chloride or anhydride

[R'CCl or (R'C)₂O] (with O's)

was added and the mixture was refluxed for one additional hour. After chilling in ice water, the product was filtered, washed with water and dried. The following polyhydrazides were prepared by this procedure.

| Polyhydrazide | [R₁C—], Mole | [TH], Mole | [ClCXCCl], Mole | mp, °C. | Yield, % |
|---|---|---|---|---|---|
| ATIH | (CH₃C)₂O, 2 | 2 | phenyl, 1 | 190 – 210 | 90 |
| ATAH | (CH₃C)₂O, 2 | 2 | —(CH₂)₄—, 1 | 250 – 70 | 90 |
| TIH | None | 1 | phenyl, 1 | 220 – 30 | 95 |
| TAH | none | 1 | —(CH₂)₄—, 1 | >280 | 92 |
| BTIH-1 | C₆H₅CCl, 2 | 2 | phenyl, 1 | 160 – 175 | 95 |
| BTIH-3 | C₆H₅CCl, 2 | 4 | phenyl, 3 | 180 – 210 | 92 |
| LTIH | C₁₁H₂₃CCl, 2 | 2 | phenyl, 1 | 170 – 210 | 90 |
| HPPTIH | HO—(X,X-phenyl)—CH₂CH₂CNHNH₂, 2 | 1 | phenyl, 1 | 150 – 160 | 70 |

| BTIH-1 | A | Dibenzoyl poly(thiodipropionylisophthaloyl) hydrazides (n=1) |
|---|---|---|
| BTIH-3 | A | Dibenzoyl poly(thiodipropionylisophthaloyl) hydrazides (n=3) |
| LTIH | A | Dilauroyl poly(thiodipropionylisophthaloyl) hydrazides (n=1) |
| HPPTIH | B | Bis[3-(3,5-di-t-butyl-4-hydroxyphenyl)propionylhydrazido] Poly(thiodipropionylisophthaloyl) hydrazides (n=1) |

General Procedure: To a solution of 1 mole of thiodipropionyl hydrazide (TH) and 2 moles of sodium hydroxide in water, a bisacid chloride

EXAMPLE 2

Preparation of Blends of Terpene-Phenol Resin and Poly(thiodipropionyldicarbonyl) Hydrazides:

One part of ATIH and two parts of Nirez V-2150 were mixed and heated at 180° C. for 20 minutes under nitrogen atmosphere. The mixture was then flaked to give the product, Blend A (mp 120°–180° C., quant. yield).

In a similar manner, a blend of Nirez V-2150 and BTIH was prepared as Blend B (mp 120°–180° C., quant. yield).

EXAMPLE 3

Evaluation of Stabilizers

The results of oven tests for polyhydrazides in polyallomer are shown in Table 1.

EXAMPLE 4

Crystallinity of Stabilizers:

Samples of the 10-mil film were placed on a hot stage and slowly heated from 25° up to 225° C., held for 5 minutes and then allowed to cool back to 25° C. The films were observed at 225 power during the heat cycle and the size of any particle or crystal formed after the films were cooled back to 25° was measured as in Table 2. During the processing of wire coating material containing copper deactivators, OABH recrystallizes as large particles after cooling; these block screen packs and cause difficulty during continuous processing. The compounds of this invention are greatly superior to OABH with respect to this problem.

Table 1

| | | Effectiveness of Stabilizers in Polyallomer (TENITE 502-S)$^a$ Oven Life at 140° C. (hr.) | | | |
|---|---|---|---|---|---|
| | | Without Cu-dust | | With 1.5% Cu-dust | |
| Item | Additives (% by Weight) | Initial | Petrolatum$^b$ Aged 240 Hrs. at 70° C. | Initial | Petrolatum$^b$ Aged 240 Hrs. at 70° C. |
| 1 | None | 45 | 100 | 2 | 45 |
| 2 | Nirez V-2150$^c$ (1.0%) | 680 | 230 | 110 | 100 |
| 3 | 2 + Poly TDP$^d$ (0.5%) | 1000 | 640 | 150 | 75 |
| 4 | 3 + OABH$^e$ (0.1%) | 1000 | 1000 | 225 | 240 |
| 5 | 2 + ATIH (0.5%) | 610 | 160 | 170 | 165 |
| 6 | 2 + TIH (0.5%) | 1000 | 160 | 170 | 190 |
| 7 | 2 + ATAH (0.5%) | 900 | 330 | 190 | 210 |
| 8 | 2 + TAH (0.5%) | 500 | 370 | 200 | 210 |
| 9 | Blend A (1.5%) | 430 | 270 | 225 | 280 |
| 10 | HPPTIH (1.0%) | 1460 | 1100 | 350 | 640 |
| 11 | Irganox 1010$^f$ (0.1%) | 1470 | 200 | 25 | 130 |
| 12 | ATIH (0.5%) | 210 | 280 | 30 | 140 |
| 13 | 11 + 12 | 1770 | 320 | 210 | 140 |
| 14 | 11 + OABH (0.1%) | 1860 | 460 | 400 | 180 |
| 15 | 11 + Poly TDP (0.5%) | 1320 | 870 | 2 | 50 |
| 16 | 15 + OABH (0.1%) | 1450 | 1100 | 230 | 250 |

$^a$A crystalline propylene-ethylene block copolymer containing about 3% by weight polyethylene segments, blended with 20% by weight of low density polyethylene having a melt index of 0.23.
$^b$Petrolatum contains 0.1% Irganox 1010.
$^c$Terpene-phenol resin made by Tenneco having a molecular weight of about 500–800, a ring and ball softening point of 148° C., and a specific gravity at 25° C. of 1.05.
$^d$Polyester of thiodipropionic acid and cyclohexanedimethanol [mol. wt. (ave.) = 2000].
$^e$Oxalyl bis(2-benzylidenehydrazide).
$^f$Tetrakis[3-(3,5-di-tert-butyl-4-hydroxyphenyl)propionyloxymethyl]methane.

Table 2

| | Measurements of Particle Size of Stabilizers in Polyallomer | |
|---|---|---|
| Item | Additives (% by wt.) | Particle Size, μ |
| 1 | Irganox 1010 (0.1), Poly TOP (0.3), OABH (0.1) | 85–284 |
| 2 | Irganox 1010 (0.1), ATIH (0.4) | 1–5 |
| 3 | Irganox 1010 (0.1), BTIH-1 (0.4) | 1 |
| 4 | Irganox 1010 (0.1), LTIH (0.4) | 1–8 |
| 5 | Nirez V-2150 (1.0), Poly TDP (0.4), OABH (0.1) | 10–80 |
| 6 | Blend A (1.5) | 1 |
| 7 | Blend B (1.5) | 1 with few 5μ |

The invention has been described in detail with particular reference to preferred embodiments thereof, but it will be understood that variations and modifications can be effected within the spirit and scope of the invention.

We claim:

1. Polyhydrazide compounds useful as stabilizers in polyolefin compositions having the formulas

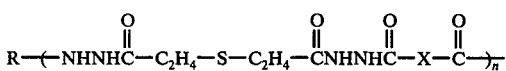

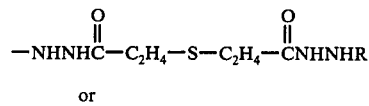

or

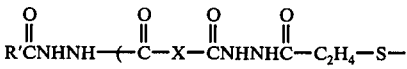

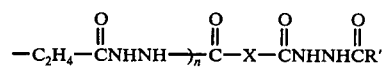

wherein
R is hydrogen or

R' is alkyl having 1 to about 20 carbon atoms, benzyl, phenyl, phenyl substituted with alkyl having 1 to about 12 carbon atoms, hydroxy, or alkoxy having 1 to about 8 carbon atoms;

n is an integer of 1 to about 10; and

X is alkylene having 1 to about 8 carbon atoms, phenylene or phenylene substituted with methyl or hydroxy.

2. Compound of claim 1 wherein R' is methyl, lauryl, stearyl, phenyl, or phenyl substituted with methyl, t-butyl, hydroxyl, methoxy or octoxy, or ethyl substituted with phenyl, or 3,5-di-tert-butyl-4-hydroxyphenyl; X is alkylene of 2 to about 4 carbon atoms, phenylene, or phenylene substituted with methyl or hydroxy; and n is an integer of 1 to about 5.

3. Compound of claim 2 wherein R' is methyl, phenyl or lauryl, X is phenylene or tetramethylene, and n is an integer of 1-2.

4. A composition comprising
   (A) at least one poly-α-olefin;
   (B) a stabilizing amount of a phenolic primary antioxidant; and
   (C) a stabilizing amount of a compound of claim 1.

5. The composition of claim 4 wherein component C is a compound of claim 2.

6. The composition of claim 5 wherein component C is a compound of claim 3.

* * * * *